W. J. WISE.
SWIVELED HOSE NIPPLE.
APPLICATION FILED JUNE 29, 1920.

1,354,710.

Patented Oct. 5, 1920.

Inventor
W. J. Wise
BY: Frease, Merkel, Saywell, & Bond
Attorneys.

UNITED STATES PATENT OFFICE.

WILLIAM J. WISE, OF NEW PHILADELPHIA, OHIO.

SWIVELED HOSE-NIPPLE.

1,354,710.                    Specification of Letters Patent.        Patented Oct. 5, 1920.

Application filed June 29, 1920.   Serial No. 392,761.

*To all whom it may concern:*

Be it known that I, WILLIAM J. WISE, a citizen of the United States, residing at New Philadelphia, in the county of Tuscarawas and State of Ohio, have invented a new and useful Swiveled Hose-Nipple, of which the following is a specification.

This invention relates to a swivel hose nipple, especially adapted for connecting the usual flexible hose to the adapter of a vacuum sweeper and for connecting the usual attachments to the flexible hose.

The objects of the invention are the provision of a swiveled nipple in the end of the flexible hose which is adapted to be connected to the adapter upon the sweeper or to any of the ordinary attachments for the sweeper and which will allow the hose to be moved into any necessary position without causing it to bend or kink and will at the same time allow the attachment to be turned into any desired position upon the hose without the necessity of turning the entire hose.

Other objects are the provision of a swiveled nipple of the character referred to which will be simple and inexpensive to manufacture and durable and efficient in use and which may be easily and readily attached to or detached from the usual adapter or attachments ordinarily used in connection with a sweeper.

With these objects in view the invention consists in the novel construction and arrangement of parts, hereinafter described, illustrated in the accompanying drawings, and particularly pointed out in the append claims, it being understood that various changes in the form, proportions, size and minor details of construction may be made within the scope of the appended claims without departing from the spirit or sacrificing any of the advantages of the invention.

The invention thus set forth in general terms is illustrated in the accompanying drawings forming part hereof, in which—

A practical embodiment of the invention is disclosed in the accompanying drawings, forming a part of this specification in which similar numerals of reference indicate corresponding parts throughout the several views.

Figure 1:
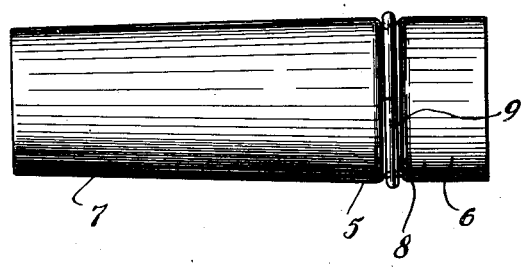
Figure 1 is a side elevation of the nipple.

The nipple 5, to which the invention pertains comprises the comparatively short cylindrical portion 6 and the comparatively long slightly tapered portion 7, an annular groove 8 being formed in the nipple between the portions 6 and 7 thereof and having loosely mounted therein a split ring 9 preferably formed of spring metal, the inner diameter of which is slightly greater than the diameter of the groove while the periphery of the ring is greater than the periphery of the nipple at its widest point.

Figure 2:
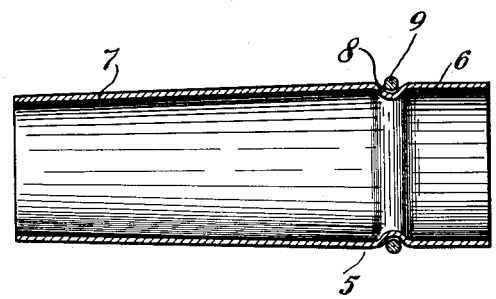
Fig. 2 is a longitudinal sectional view of the same.
Figure 3:
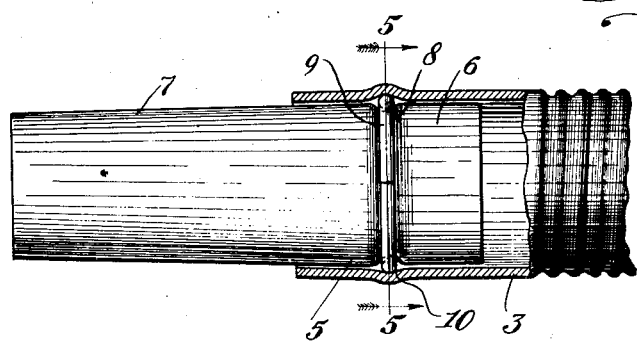
Fig. 3 is an elevation of the nipple attached within the flexible hose, the hose being broken in section for the purpose of illustration.
Figure 4:
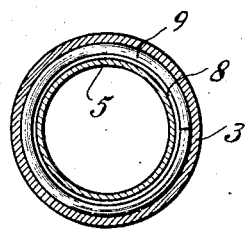
Fig. 4 is a section on the line 5—5, Fig. 4.

In assembling the nipple within the flexible hose 3 the split ring 9 is sprung upon the nipple and into the groove 8 therein as shown in Figs. 1 and 2 and the cylindrical end 6 of the nipple is then inserted for a short distance into the end of the hose, the ring 9 forming a slight annular groove within the hose as shown at 10 and being seated firmly therein and frictionally held in position within the hose while the nipple 5 which is of slightly less diameter than the inner diameter of the hose is loosely held in place within the hose by means of the ring and is easily rotated within the hose.

The tapered portion 7 of the nipple may be easily inserted in the neck of the adapter or the neck of any ordinary type of attachment and the flexible hose is thus free to be turned in any direction without the danger of bending or kinking the hose as it will easily swivel at the point where it is connected to the adapter thus relieving the hose from any torsion due to moving or turning of the hose into any desired or necessary position while at the same time the attachment upon the end of the hose may be easily turned upon its axis into any position necessary without changing the position of the hose.

I claim:—

1. In combination with a flexible hose, a ring frictionally mounted within the hose near the end thereof and a nipple rotatably mounted within the ring and protruding from the end of the hose.

2. In combination with a flexible hose, a ring frictionally mounted within the hose near the end thereof and a nipple provided with an annular groove rotatably mounted within the ring and protruding from the end of the hose.

3. In combination with a flexible hose, a ring of greater diameter than the inner diameter of the hose frictionally mounted within the hose near the end thereof and a nipple of slightly less diameter than the inner diameter of the hose, and provided with an annular groove of less diameter than the inner diameter of the ring, the ring being mounted within said annular groove and the nipple, protruding from the end of the hose.

4. A nipple provided with an annular groove near one end and a split ring rotatably mounted within said groove, the periphery of said ring being greater in diameter than the nipple, said ring being adapted to be inserted within the end of a flexible hose or the like.

In testimony that I claim the above, I have hereunto subscribed my name.

WILLIAM J. WISE.